US012171701B2

(12) United States Patent
Stehr et al.

(10) Patent No.: US 12,171,701 B2
(45) Date of Patent: Dec. 24, 2024

(54) WHEELCHAIR ARMREST WITH CONTINUOUS PASSIVE MOTION MECHANISM

(71) Applicants: Justin David Stehr, Franklin, TN (US); Manuel Aaron Fitzgerald, Huntington Beach, CA (US)

(72) Inventors: Justin David Stehr, Franklin, TN (US); Manuel Aaron Fitzgerald, Huntington Beach, CA (US)

( * ) Notice: Subject to any disclaimer, the term of this patent is extended or adjusted under 35 U.S.C. 154(b) by 539 days.

(21) Appl. No.: 17/580,460

(22) Filed: Jan. 20, 2022

(65) Prior Publication Data

US 2023/0225918 A1 Jul. 20, 2023

(51) Int. Cl.
*A61G 5/12* (2006.01)

(52) U.S. Cl.
CPC .................................... *A61G 5/125* (2016.11)

(58) Field of Classification Search
CPC ...................................................... A61G 5/125
USPC ...................................................... 280/304.1
See application file for complete search history.

(56) References Cited

U.S. PATENT DOCUMENTS

| | | | | |
|---|---|---|---|---|
| 3,140,119 | A | | 7/1964 | Offner |
| 3,376,066 | A | | 4/1968 | Kernes |
| 3,382,000 | A | | 5/1968 | Sully |
| 3,767,260 | A | | 10/1973 | Limpach |
| 3,865,434 | A | | 2/1975 | Sully |
| 4,489,980 | A | | 12/1984 | Friedrich |
| 4,489,981 | A | | 12/1984 | Goletski |
| 5,242,138 | A | * | 9/1993 | Kornberg ................ A61G 5/12 248/118 |
| 5,255,956 | A | | 10/1993 | Stevens |
| 7,866,613 | B2 | * | 1/2011 | Cramer ................. A61G 5/125 248/292.12 |
| 8,066,332 | B2 | | 11/2011 | Huang |
| 8,251,393 | B2 | | 8/2012 | Fremgen et al. |
| 8,292,314 | B1 | | 10/2012 | Schaal et al. |
| 9,107,507 | B2 | | 8/2015 | Wallis |
| 10,143,607 | B2 | * | 12/2018 | Ravn ........................ A61G 5/14 |
| 10,314,750 | B2 | | 6/2019 | Derks et al. |
| 10,537,175 | B2 | | 1/2020 | Chen |
| 10,548,785 | B2 | | 2/2020 | Vermij et al. |
| 10,617,580 | B2 | * | 4/2020 | Steiner ................. A61G 5/1024 |
| 11,045,003 | B2 | | 6/2021 | Fietz et al. |
| 11,089,923 | B2 | * | 8/2021 | Roff ....................... A47K 13/10 |
| 2002/0056970 | A1 | | 5/2002 | Groth |
| 2003/0189361 | A1 | | 10/2003 | Chen et al. |

(Continued)

OTHER PUBLICATIONS

Peter Hall Hodges, The Optimal Kinematic Synthesis of Planar, Fully Cycle, Constant-Velocity, Straight-Line Mechanisms, (1992) (Year: 1992).*

*Primary Examiner* — James A English
*Assistant Examiner* — Morgan Rappe
(74) *Attorney, Agent, or Firm* — Eric Karich; Karich & Associates

(57) ABSTRACT

A wheelchair for supporting a user, and for providing movement of the user's arm has a wheelchair body supported by wheels for supporting the user for rolling movement, an armrest for supporting the user's arm thereupon, and a movable mounting mechanism for mounting the armrest on the wheelchair body so that the armrest can move between a first position and a second position. A movement mechanism moves the armrest between the first and second positions.

8 Claims, 8 Drawing Sheets

(56) References Cited

U.S. PATENT DOCUMENTS

| | | | |
|---|---|---|---|
| 2005/0279540 | A1 | 12/2005 | Wisner et al. |
| 2008/0221492 | A1 | 9/2008 | El'Chonen |
| 2012/0078142 | A1 | 3/2012 | Fenkell |
| 2021/0290458 | A1 | 9/2021 | Gfoehler et al. |

* cited by examiner

WHEELCHAIR ARMREST WITH CONTINUOUS PASSIVE MOTION MECHANISM

BACKGROUND OF THE INVENTION

Field of the Invention

This invention relates generally to wheelchairs, and more particularly to a wheelchair that includes an armrest that incorporates a continuous passive motion mechanism.

Description of Related Art

Wheelchairs have been developed that have adjustable armrests, for adjusting the armrest to an optimal position for a given user. These include, for example, Huang, U.S. Pat. No. 8,066,332, which teaches a wheelchair armrest adjusting mechanism that includes a support unit having a horizontal support connected to a top of an upright support, and a plurality of locking units located one side of the horizontal support. An armrest has a slide channel for engaging with the horizontal support, a stop hole for creating a passage to the slide channel in order to fit one of the locking units when the stop hole is aligned with the locking unit, and a control unit fitted in the stop hole for pushing against the locking unit. When the control unit is pushed and held, the armrest can be slid along the horizontal support to align with one of locking units; and when the control unit is released, the locking unit is pushed into the stop hole and thereby locks the armrest in place.

Another example is shown in Cramer, U.S. Pat. No. 7,866,613, which teaches an apparatus for mounting a wheelchair arm pad to a wheelchair that provides adjustability such that it can be used with wheelchairs from a wide variety of different manufacturers. The apparatus provides for a single point mounting system having elevation, articulation, depth, and width adjustability.

Sully, U.S. Pat. No. 3,865,434, teaches a movable wheelchair arm rest which is pivotally mounted on a pair of rotating links to move arcuately between forward and rear positions (the rear position allows access to the side of the chair). The arm includes interconnecting linkages which mate with the wheelchair frame to securely and rigidly anchor the arm in both the forward and rear positions.

The prior art teaches wheelchair armrests that are adjustable in position, for the comfort of the user. However, the prior art does not teach a movable armrest that includes a continuous passive motion mechanism that functions to move the armrest in a reciprocating manner for therapeutic benefits. The present invention fulfills these needs and provides further advantages as described in the following summary.

SUMMARY OF THE INVENTION

The present invention teaches certain benefits in construction and use which give rise to the objectives described below.

The present invention provides a wheelchair for supporting a user, and for providing movement of the user's arm. The wheelchair comprises a wheelchair body supported by wheels for supporting the user for rolling movement, an armrest for supporting the user's arm thereupon, and a movable mounting mechanism for mounting the armrest on the wheelchair body so that the armrest can move between a first position and a second position.

A movement mechanism moves the armrest between the first and second positions.

A primary objective of the present invention is to provide a wheelchair having advantages not taught by the prior art.

Another objective is to provide a wheelchair adapted to move a person's arm via an armrest of the wheelchair for therapeutic benefit.

A further objective is to provide a wheelchair having an armrest that can move between multiple positions via a movement mechanism.

In some embodiments, movement of the wheelchair wheel provides the movement of the armrest.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a wheelchair that includes a continuous passive motion mechanism for providing movement to a user's arm while the user is seated in the wheelchair.

Figure 1:
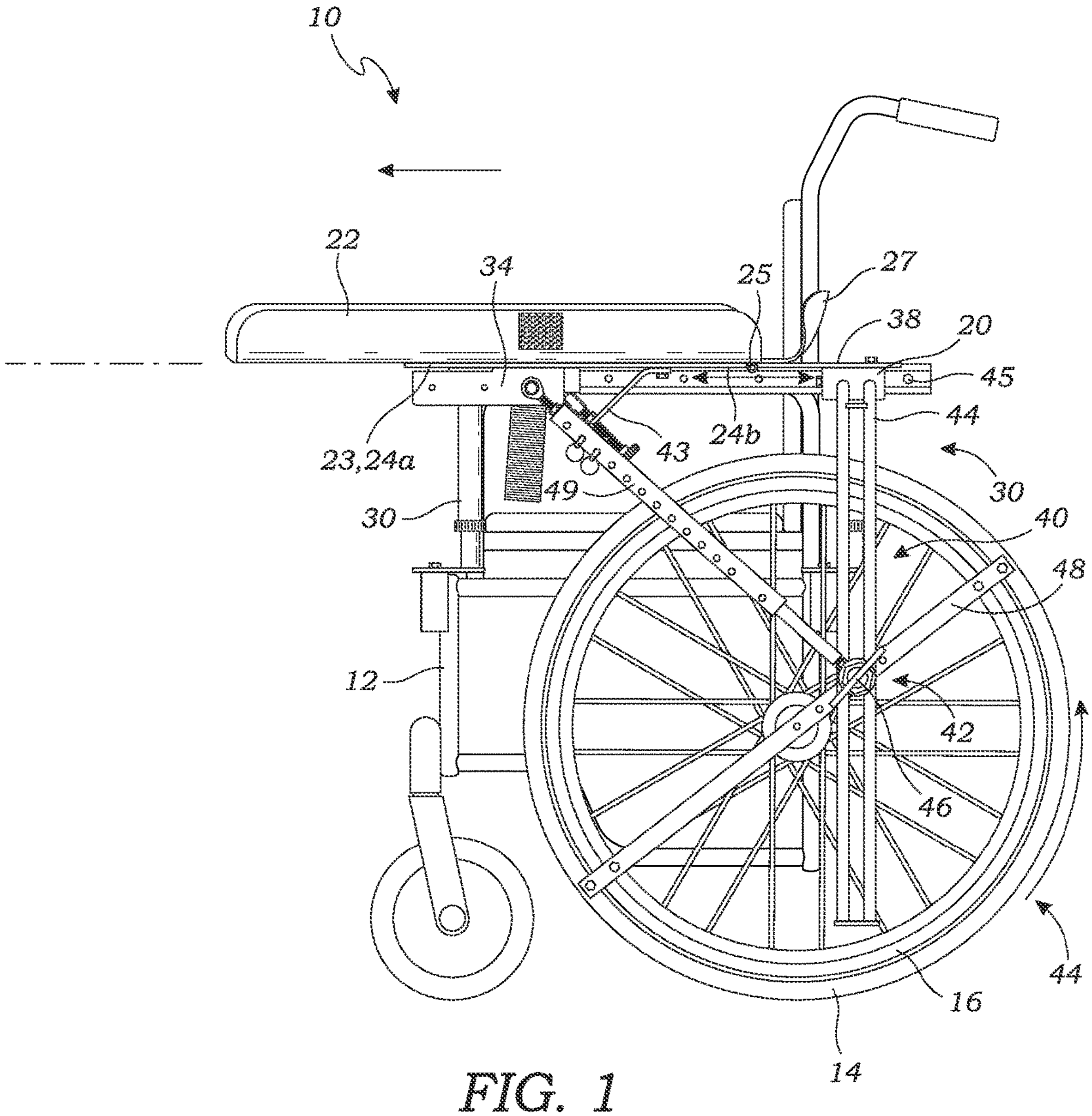
FIG. 1 is a side elevation view of a wheelchair according to one embodiment of the present invention, showing an armrest of the wheelchair in a first position.

FIG. 1 is a side elevation view of a wheelchair 10 according to one embodiment of the present invention. As shown in FIG. 1, the wheelchair 10 comprises a wheelchair body 12 supported by wheels 14 for supporting the user for rolling movement, and an armrest 22 for supporting the user's arm thereupon. The wheels 14 of the wheelchair 10 include an annular hand grip 16 that the user may grasp for propelling the wheelchair 10 forward or backwards. The general construction of the wheelchair is well known, and is therefore not described in greater detail herein.

As shown in FIG. 1, the armrest 22 may be on either side of the wheelchair 10, depending upon which arm requires treatment. The armrest 22 is mounted to the wheelchair 10 via a movable mounting mechanism 30, discussed in greater detail below, which enables the initial position of the armrest 22 to be adjusted to the requirements of the individual user.

Figure 2:
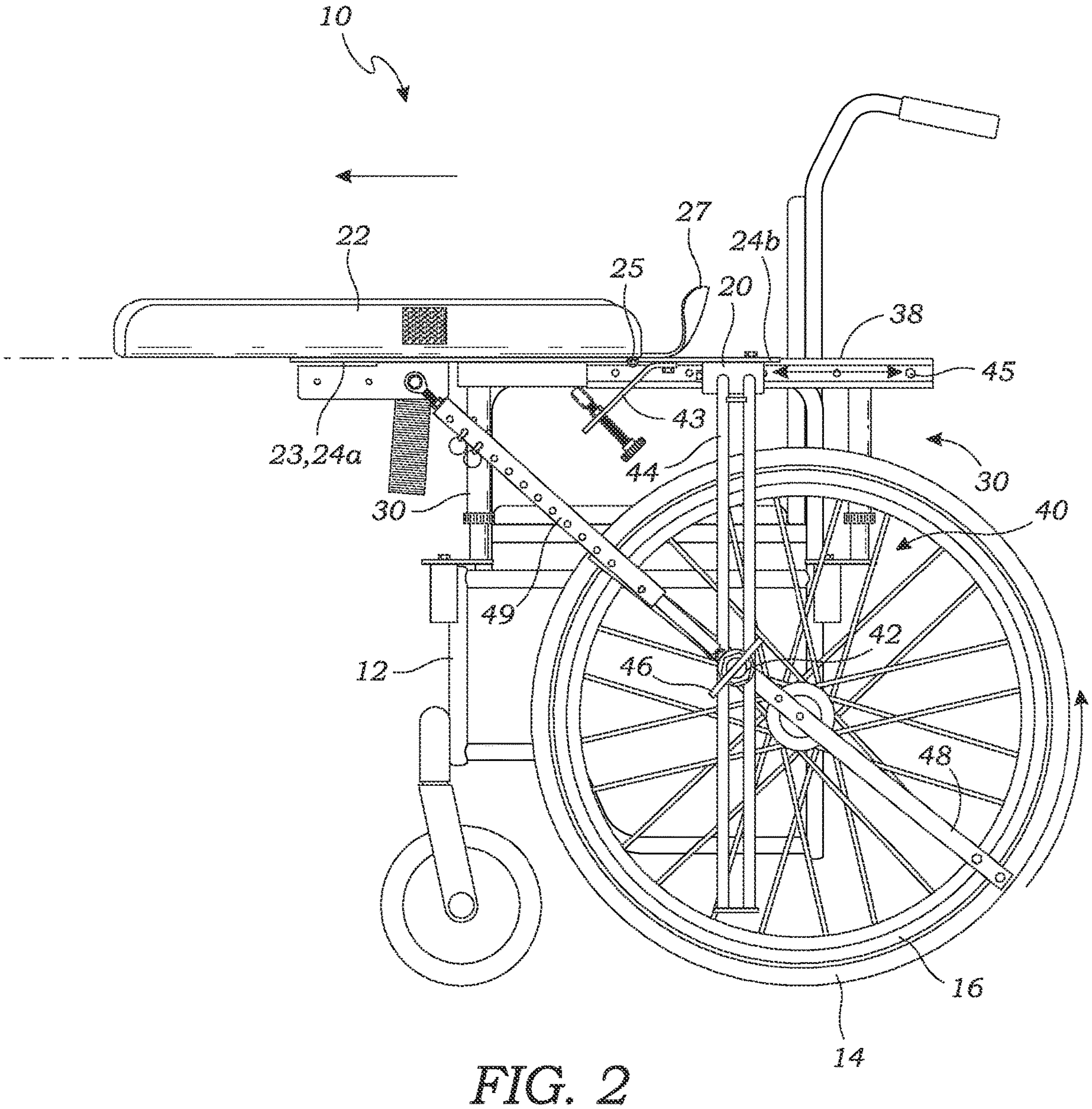
FIG. 2 is a side elevation view thereof, showing the armrest moving forward toward a second position.
Figure 3:
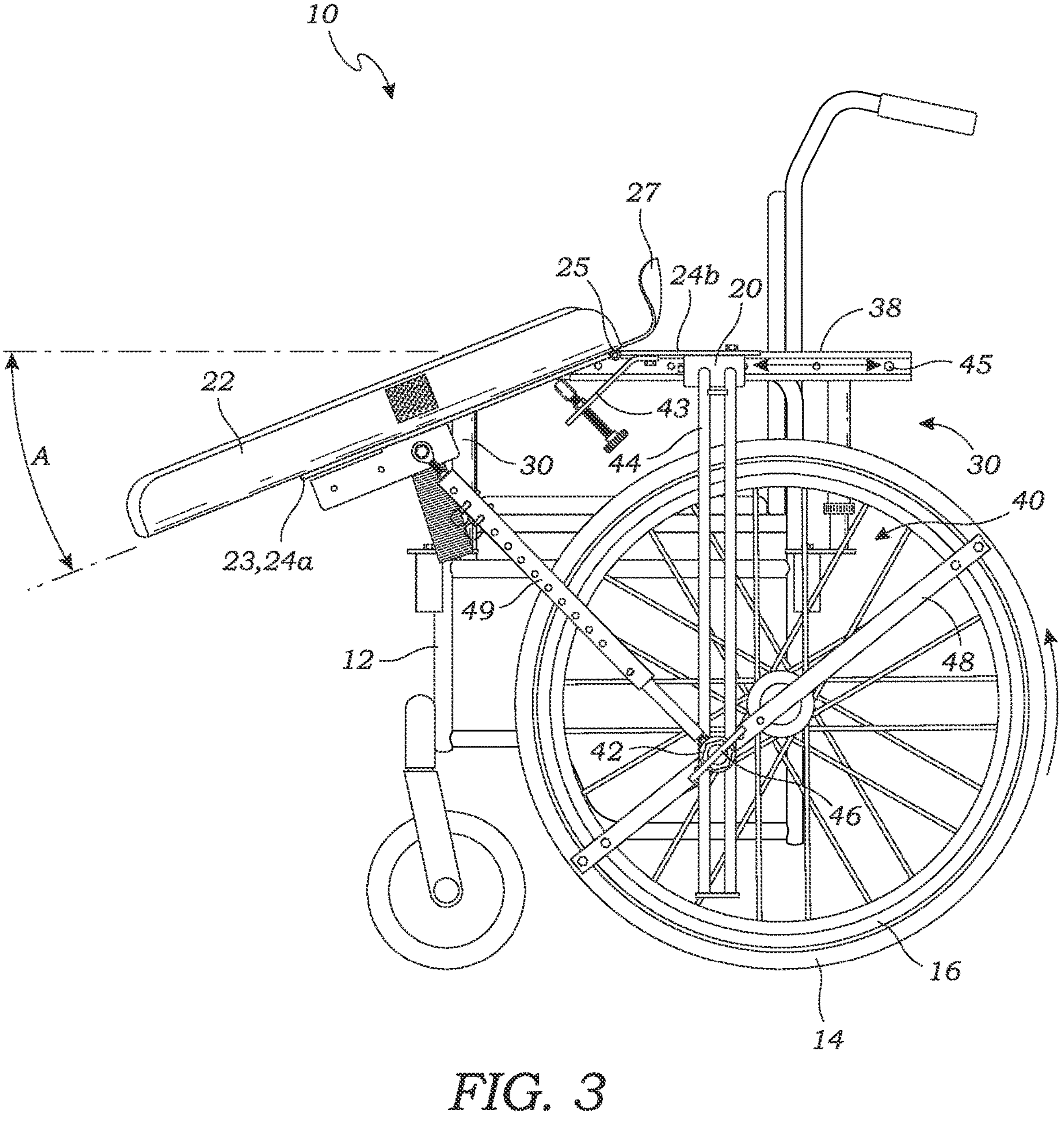
FIG. 3 is a side elevation view thereof, showing the armrest once it has been lowered to a third position.
Figure 4:
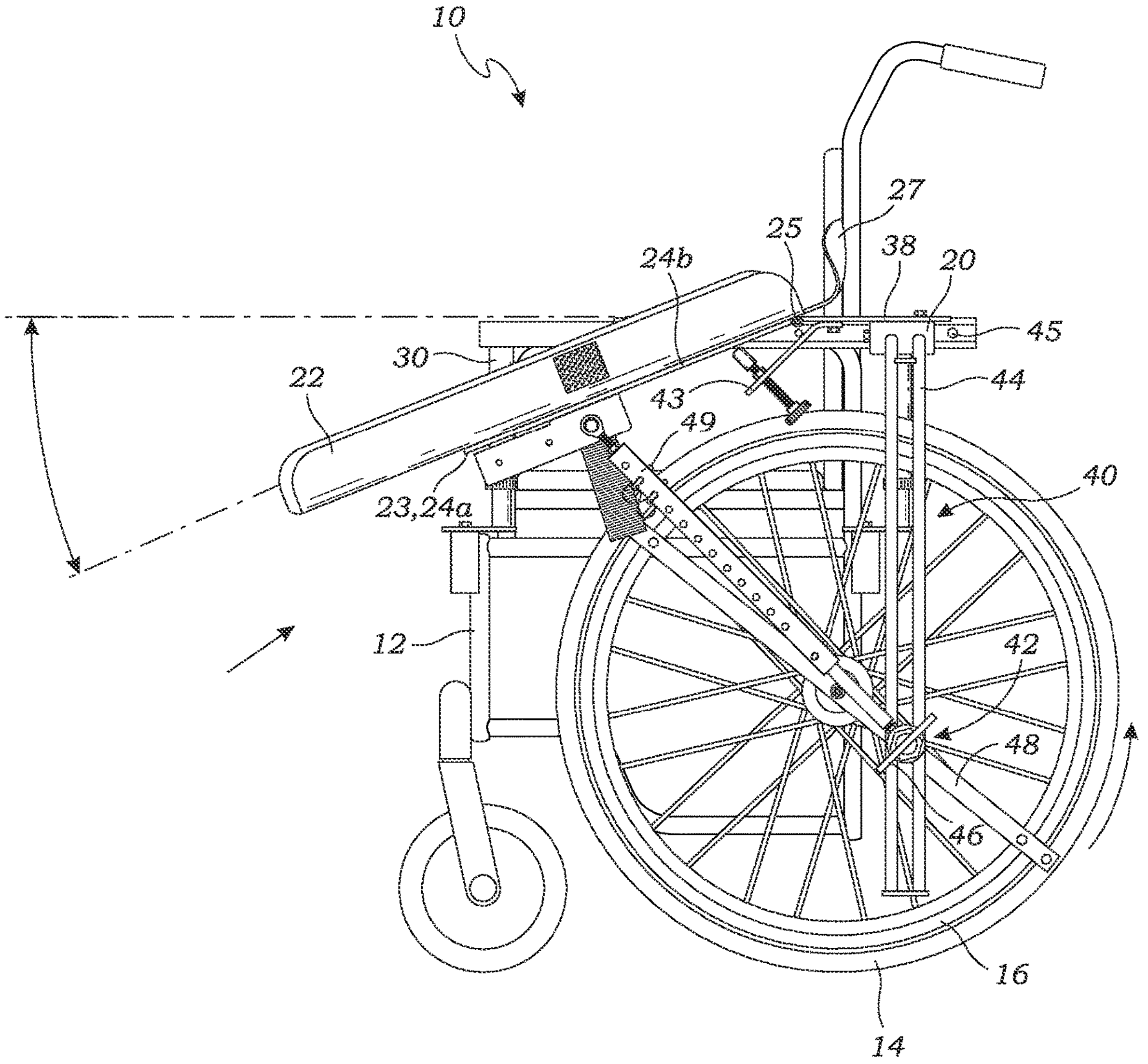
FIG. 4 is a side elevation view thereof, showing the armrest once it has been retracting back to a fourth position, while still in the lowered position.

Critical to the invention, the wheelchair 10 further includes a movement mechanism 40 that enables the armrest 22 to move between the first position shown in FIG. 1, and a second position shown in FIG. 2, as well as optionally additional positions, such as a third position shown in FIG. 3, and a fourth position shown in FIG. 4. The movement mechanism 40 is also discussed in greater detail below.

The movement mechanism 40 causes the armrest 22 to move forward and back, and also optionally vertically up and down, when the wheels 14 of the wheelchair 10 are rotating. The movement is particularly arranged to provide therapeutic benefit to the arm, such as increased flexibility, blood flow, etc. in the arm/shoulder area, and/or the user may receive other benefits of continuous passive motion of the arm while movement mechanism 40 is in motion.

In this embodiment, as shown in FIG. 1, the movement mechanism 40 includes a scotch yoke 42. The scotch yoke 42 may comprise an externally threaded pin 46 fixedly mounted to one of the wheels 14 of the wheelchair 10, and a yoke 44 operably attached to the armrest 22, so that rotation of the wheel 14 is translated via the externally threaded pin 46 and the yoke 44 to a reciprocal movement of the armrest 22, discussed further below. While the scotch yoke 42 illustrates one embodiment of the movement mechanism 40, alternative mechanisms may also be used, and should be considered within the scope of the present invention. Some alternative embodiments are discussed below.

FIG. 2 is a side elevation view of the wheelchair 10, showing the armrest 22 once it has moved forward, horizontally, to a second position. In this position, the armrest 22 is forward of the first position shown in FIG. 1. In some embodiments, the armrest 22 might simply reciprocate between the first and second positions, giving the arm movement in this single dimension of movement. In the present embodiment, however, the armrest 22 further includes a lowering raising movement as part of the range of movement.

FIG. 3 shows the armrest 22 once it has been lowered to a third position. In the third position, the armrest 22 is lowered, but remains substantially in the forward position. In this embodiment, the armrest 22 is lowered so that it forms an angle A with the horizon.

FIG. 4 shows the armrest 22 once it has been retracting back to a fourth position, while still in the lowered position. Continued rotation returns the armrest 22 to the raised configuration of the first position shown in FIG. 1.

As shown in FIGS. 1-4, the movement mechanism 40 of this embodiment enables forward and backward movement of the armrest 22 in a horizontal direction, and upwards and downwards movement in the vertical direction, as determined by the location of the externally threaded pin 46 on the wheel 14 of the wheelchair 10, as transmitted via the yoke 44.

In this embodiment, the movement mechanism 40 includes a front movement rod 49 which provides the vertical movement, as it moves during rotation of the wheel 14. In other embodiments, the armrest 22 may also or alternatively move outwardly and inwardly, depending on the proportions of the wheelchair 10 and the user. The armrest 22 may further be adjustable inwardly and outwardly to accommodate different movements of the arm, as required by doctors and other caregivers.

As shown in FIGS. 1-4, in some embodiments, the armrest 22 may further include a movement lock 43, for optionally halting the downward movement of the armrest 22. This is shown in more detail in FIG. 5, and is discussed in greater detail below.

Figure 5:
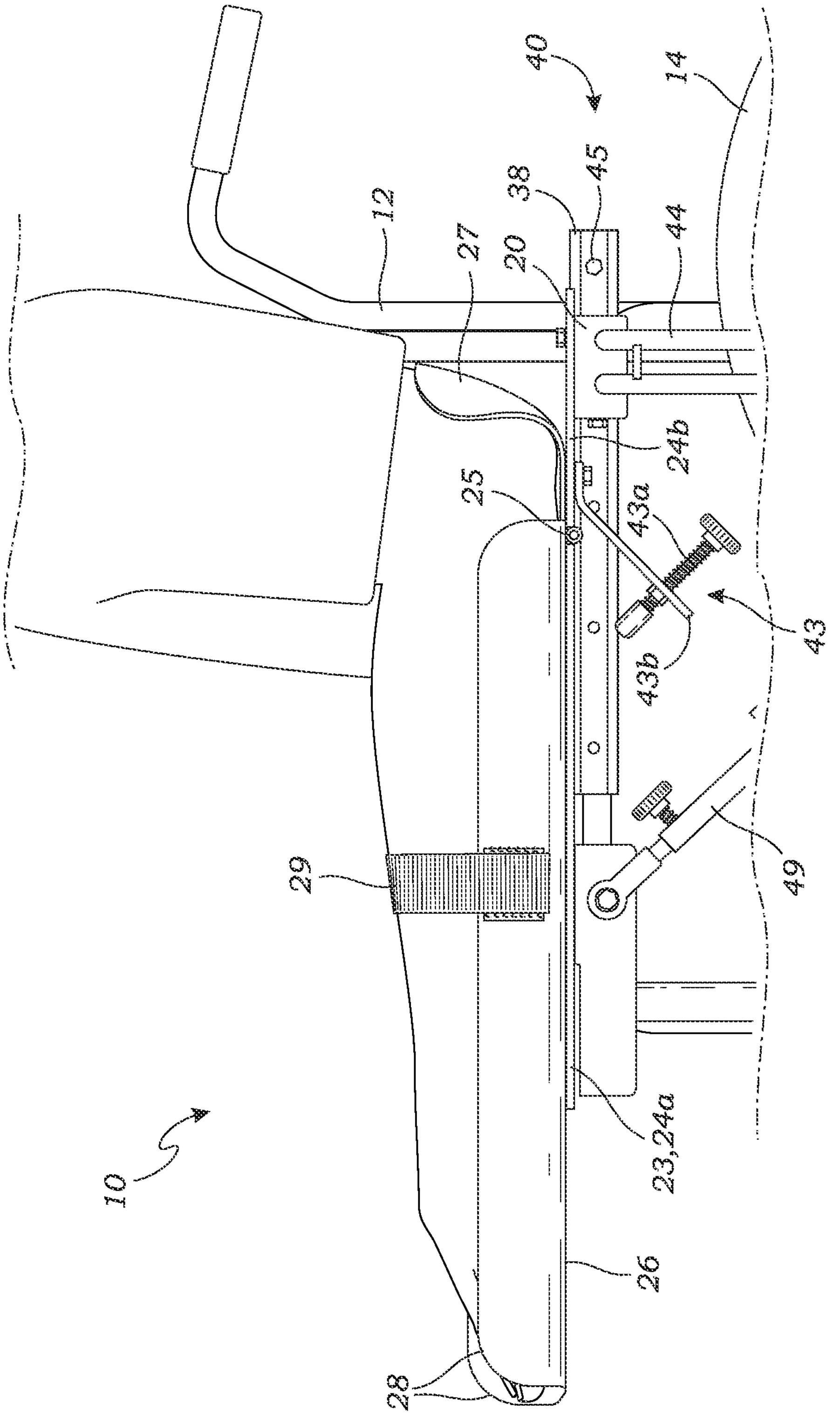
FIG. 5 is an up-close side elevation view of a person using the wheelchair, illustrating the person's arm within the armrest.

FIG. 5 is an up-close side elevation view of a person using the wheelchair 10, illustrating the person's arm within the armrest 22. As shown in FIG. 5, the armrest 22 may comprise an base plate 23 that may include a front portion 24*a* pivotally connected to a rear portion 24*b*. In this embodiment, a hinge 25 connects the front and rear portions 24*a* and 24*b* so that the front portion 24*a* can pivot with respect to the rear portion 24*b*.

In this embodiment, the armrest 22 includes an arm support cradle 26 that is mounted on the base plate 23, in this case mounted to the front portion 24*a*. The arm support cradle 26 includes an upwardly extending rear wall 27 adjacent the rear portion 24*b* that is adapted to receive the user's elbow, and upwardly extending sidewalls 28 adjacent the front portion 24*a* for positioning the user's arm in place. Alternatively, the arm support cradle 26 may be differently structured, e.g., without the upwardly extending walls, or in the form of a tubular structure, etc., or any other suitable forms of armrests known to those skilled in the art. In this embodiment, a fastener 29 is further included (in this case in the form of a hook-and-loop fastener) attached to the upwardly extending sidewalls 28 for securing the user's arm in place. However, in other implementations of the present invention, the fastener 29 may be a different type of fastener (e.g., a tie-strap, sheathe, clip, etc.), or the fastener 29 may be positioned elsewhere on the armrest 22, or excluded from the product. Furthermore, the armrest 22 may include any additional features deemed suitable by the manufacturer, e.g., cushioning, a gripping handle, remote control functions, etc., or any other features desired.

The base plate 23 is operably mounted on the wheelchair 10 for movement, as shown in FIGS. 1-4. In this embodiment, the rear portion 24*a* of the base plate 23 is mounted on a carriage 20 that is mounted on a horizontal track 38 that is mounted on the wheelchair body 12. The carriage 20 slides forward and back on the track 38. Stop bolts 45 at the ends of the track 45 prevent the carriage 20 from falling off the track 38.

In this embodiment, the movement mechanism 40 may include a front movement rod 49 that is operably connected with the pin and the front end 24*a* of the armrest 22, that enables vertical movement of the armrest 22 via the hinge 25 of the base plate 23. The length of the front movement rod 49 may be adjustable, so that the movement of the armrest 22 may be adjusted to a desired range of motion. In this embodiment, the movement mechanism 40 includes, as the yoke 44, a pair of upwardly extending posts. This is shown in more detail in FIG. 6, as discussed below.

The movement lock 43, in this embodiment, as shown in FIG. 5, includes an adjustable stop 43*a* (in this case in the form of a screw) that is mounted on a plate 43*b*. The adjustable stop 43*a* prevents vertical movement of the armrest 22 beyond a certain point, so that a doctor or caregiver can make sure movement is limited to an acceptable range of motion.

Figure 6:
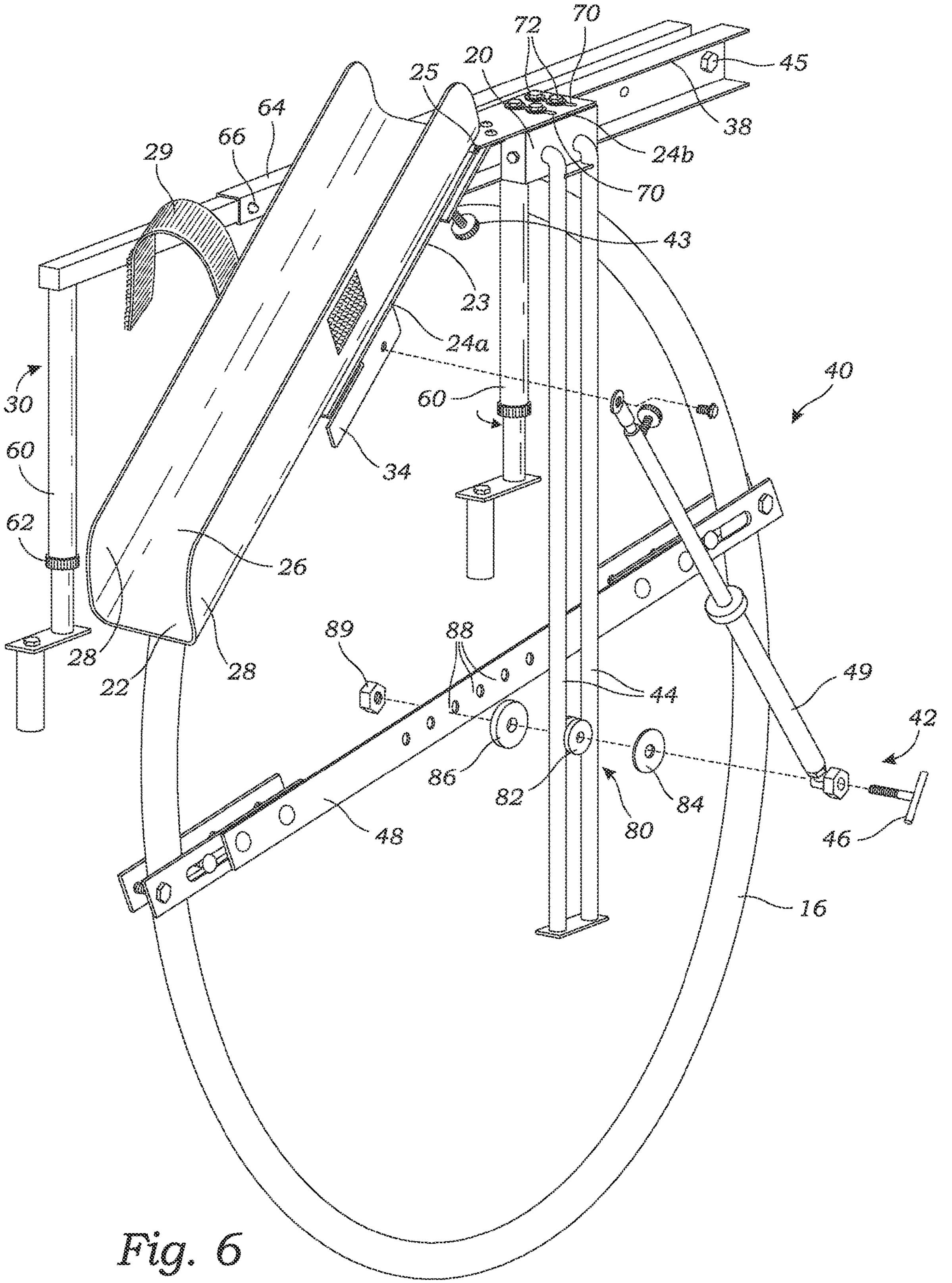
FIG. 6 is a perspective, partially exploded view of the movement mechanism of FIGS. 1-4, shown without the wheelchair.

FIG. 6 is a perspective, partially exploded view of the movable mounting mechanism 30 and the movement mechanism 40 of FIGS. 1-4. In this figure, the operative components are shown without the wheelchair body and wheel, for clarity. The hand grip 16 of the wheelchair, however, is shown, to illustrate a connection therewith.

As shown in FIG. 6, in this embodiment, the movable mounting mechanism 30 enables forward and backward movement of the armrest 22 in a horizontal direction that is aligned with the direction of rectilinear movement of the one of the wheels 14 having the externally threaded pin 46. In the current embodiment, the movable mounting mechanism 30 further enables movement of at least a part of the armrest 22 in a vertical direction.

In this embodiment, the movable mounting mechanism 30 includes a pair of vertical posts 60 that are telescopically adjustable in length, and a horizontal post 64 that connects the pair of vertical posts 60 and is also telescopically adjustable in length. A vertical locking mechanism 62 locks each of the vertical posts 60 in a desired position. In the illustrated embodiment, a locking mechanism is in the form of a rotatable clutch that locks a desired location; however, any form of locking mechanism may be used, e.g., spring locking pins, any form of locking lever, and any other mechanism known in the art.

As shown in FIG. 6, the horizontal post 64 also includes a locking mechanism 66, illustrated in this case as a spring locking pin, although as noted above this can be any locking mechanism known in the art.

While one embodiment of the movable mounting mechanism 30 is shown, other forms of adjustable frame design, many of which are discussed in the Background section above, may be used, and should be considered within the scope of the present invention.

As shown in FIG. 6, in this embodiment, in which the movement mechanism 40 includes a scotch yoke 42, the scotch yoke 42 includes both the yoke 44, in this case a pair of upwardly extending posts, and a pin assembly 80. The pin assembly 80 of the scotch yoke 42 is attached to the wheel 14 of the wheelchair 10, in this case via a wheel mounting clamp 48 which is adapted to be removably mounted on the hand grip 16 of the wheelchair wheel (not shown in this figure). In this embodiment, as illustrated in FIG. 1, the wheel mounting clamp 48 is in the form of an elongate cross-bar that extends the diameter of the hand grip 16 and attaches at either end. The wheel mounting clamp 48 may include a plurality of apertures 88 which enable the pin assembly 80 to be attached to different locations, for adjusting the movement of the scotch yoke 42. The apertures 88 may be internally threaded, or a nut 89 may be used, as shown. In some embodiments, the wheel mounting clamp 48 may be adjustable for different sizes of hand grip 16. In this embodiment, the wheel mounting clamp 48 includes a hand grip clamp at each end for clamping onto the hand grip 16, however, other mounting mechanisms may also be used, and should be considered within the scope of the present invention. The pin assembly 80 could alternatively be attached as an integral part of the wheel, or it could be attached in other ways.

In some embodiments, the yoke 44 is fixedly attached to the carriage 20 and thus to the rear portion 24*b* of the armrest 22, for enabling sliding movement on the horizontal track 38. The yoke 44 extends downwardly a length that is equal to or greater than the lowest point the pin assembly 80 reaches during rotation of the wheel 14.

In this embodiment, the rear portion 24*b* of the armrest 22 includes slots 70, and the carriage 20 is attached to the slots 70 with fasteners 72 (e.g., bolts), so that the carriage 20 and yoke 44 may be adjusted laterally to fit any common sizes of wheelchair.

In the embodiment of FIG. 6, the pin assembly 80 is an assembly that includes a wheel 82 that rotatably engages the yoke 44. The wheel 82 is held in place between an outer washer 84 and an inner washer 86 that are large enough to traverse the yoke 44. The externally threaded pin 46 engages the front movement rod 49 and extends through the washers 84 and 86 and the wheel 82 to extend through one of the apertures 88 of the wheel mounting clamp 48 either threadedly engaging the wheel mounting clamp 48, or engaging a bolt behind it.

Figure 7:
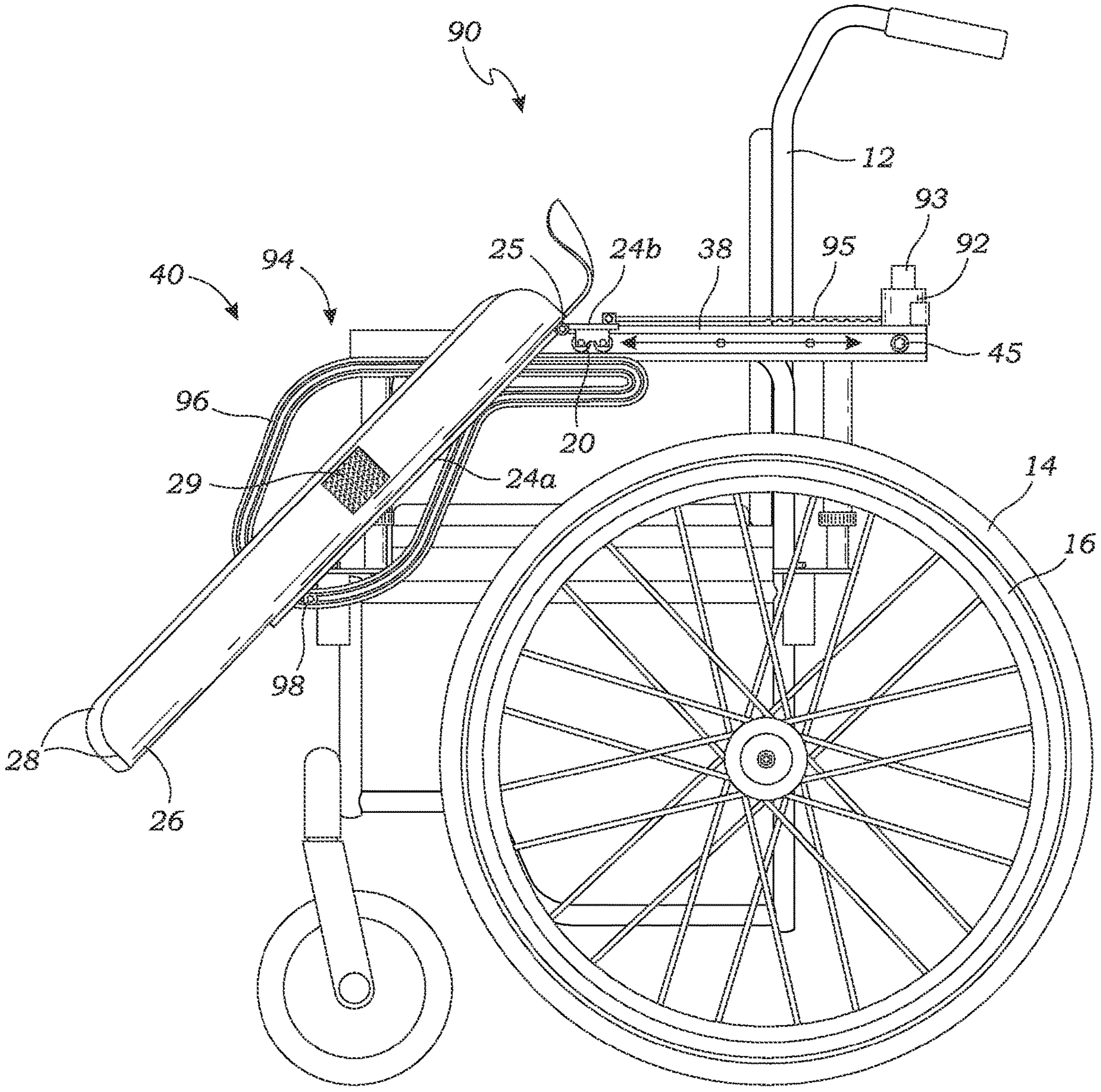
FIG. 7 is a side elevation view of a second embodiment of the wheelchair.

FIG. 7 is a side elevation view of a second embodiment 90 of the wheelchair, where the movement mechanism 40 includes an actuator 92 (instead of a scotch yoke) that is mounted on the wheelchair body 12 and is operably connected with the armrest 22 to impart a reciprocal movement of the armrest 22. As illustrated, the actuator 92 may be mounted to or adjacent the armrest 22, or elsewhere (e.g., seat back, lower frame, etc.). In some implementations, the actuator 92 actuates the movement of a rod 95 to move the armrest 22, or the actuator 92 may directly move the armrest 22. While two examples are illustrated and discussed herein, alternative movement mechanisms and/or movable mounting mechanisms may be implemented, provided each is within the scope of the claims of the present invention. In this embodiment, the actuator 92 is associated with a counter 93 for counting movements of the armrest 22, although the counter 93 could be located anywhere for making the count, which is useful for physical therapy purposes.

In this embodiment, the movement mechanism 40 includes an armrest guide 94 for guiding the movement of the armrest 22. In this embodiment, the armrest guide 94 includes a track 96 that engages a post 98 of the armrest 22, so that the armrest 22 moves along the path of the track, preferably including both horizontal and vertical portions that are suitable for rehab. The size and shape of the track may be varied to accommodate different treatment regimes, and they may be changed over time (e.g., to increase range of motion after a suitable period of time).

Figure 8:
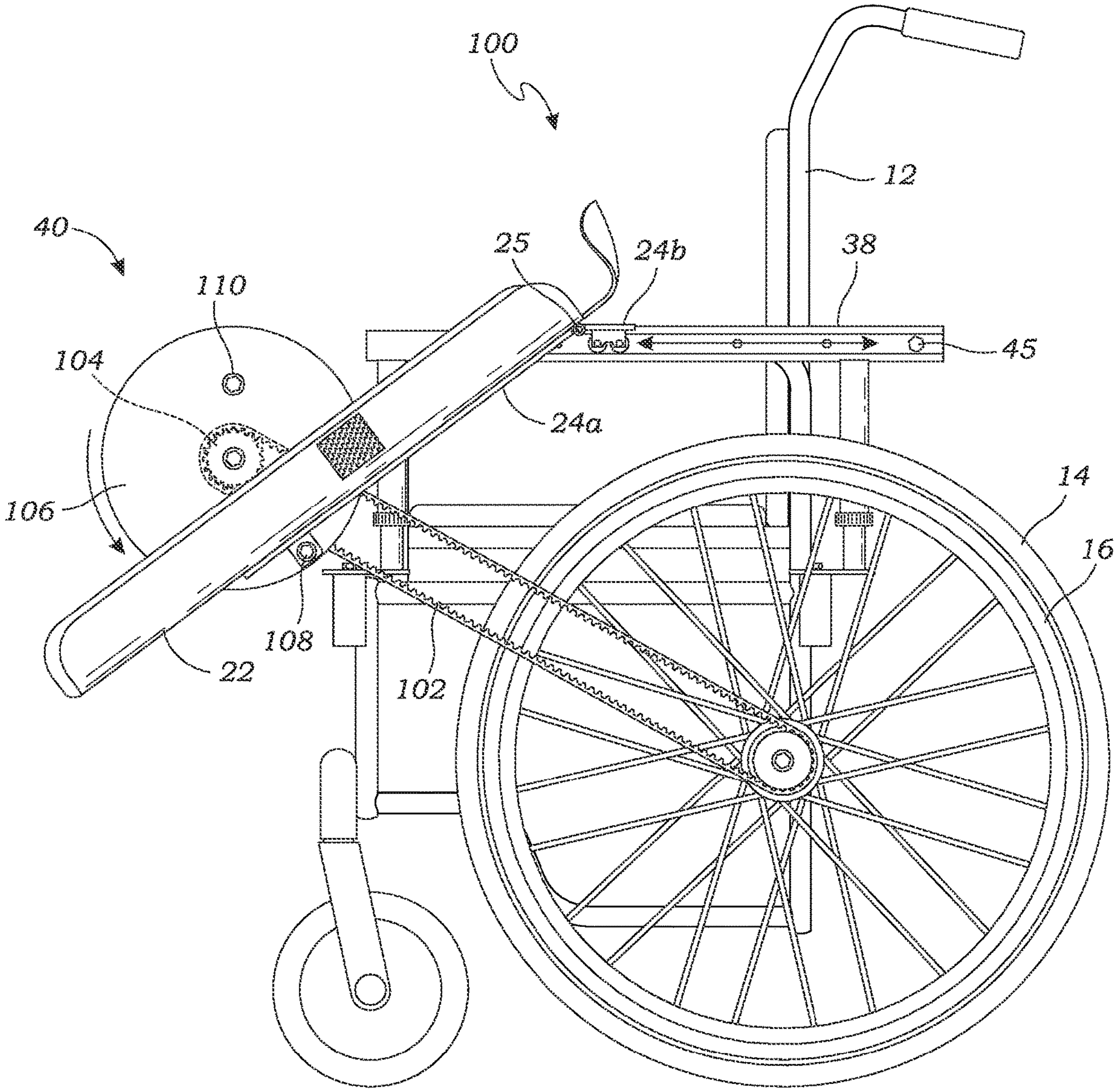
FIG. 8 is a side elevation view of a third embodiment of the wheelchair.

FIG. 8 is a side elevation view of a third embodiment of the wheelchair 100. As shown in FIG. 8, in this embodiment the movement mechanism 40 is in the form of a chain drive. In this embodiment, a drive chain 102 (which may be a literal chain, or any form of cable or equivalent transmission) operably connects the wheel 14 of the wheelchair with a sprocket 104 of a guide structure 106 (e.g., round plate, as shown, or other functionally equivalent structure). A connector post 108 extends from the guide structure and is connected with the armrest 22 (in this case, to the front portion 24*b*) so that movement of the wheel 16 is transmitted to the armrest 22. The guide structure 106 may include alternative attachment points 110, enabling the caregiver to adjust the movement parameters of the armrest 22.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A wheelchair for supporting a user, and for providing movement of the user's arm, the wheelchair comprising:

a wheelchair body supported by wheels for supporting the user for rolling movement;

an armrest for supporting the user's arm thereupon;

a movable mounting mechanism for mounting the armrest on the wheelchair body so that the armrest can move between a first position and a second position;

a movement mechanism that moves the armrest between the first and second positions;

wherein the movement mechanism includes a scotch yoke; and wherein the scotch yoke includes a pin fixedly mounted to one of the wheels of the wheelchair, and a yoke operably attached to the armrest, so that rotation of the wheel is translated via the pin and yoke to a reciprocal movement of the armrest.

2. The wheelchair of claim 1, wherein the yoke is connected to a rear portion of the armrest, and the movement mechanism further includes a front movement rod that is operably connected with the pin and a front end of the armrest.

3. The wheelchair of claim 2, wherein the armrest includes a hinge connecting the front portion and the rear portion of the armrest, so that the front portion can pivot with respect to the rear portion of the armrest.

4. The wheelchair of claim 1, wherein the pin extends laterally from a wheel mounting clamp which is adapted to be removably mounted on the one of the wheels.

5. The wheelchair of claim 1, wherein the movable mounting mechanism enables forward and backward movement of the armrest in a horizontal direction that is aligned with the direction of rectilinear movement of the one of the wheels having the pin.

6. The wheelchair of claim 4, wherein the movable mounting mechanism further enables movement of at least a part of the armrest in a vertical direction.

7. The wheelchair of claim 1, wherein the movable mounting mechanism includes a pair of vertical posts that are telescopically adjustable in length, and a horizontal post that connects the pair of vertical posts and is also telescopically adjustable in length.

8. A wheelchair for supporting a user, and for providing movement of the user's arm, the wheelchair comprising:

a wheelchair body supported by wheels for supporting the user for rolling movement;

an armrest for supporting the user's arm thereupon;

a movable mounting mechanism for mounting the armrest on the wheelchair body so that the armrest can move between a first position and a second position, so that rotation of the wheel is translated via the movable mounting mechanism into a reciprocal movement of the armrest.

* * * * *